(12) United States Patent
Kaifu et al.

(10) Patent No.: US 7,193,028 B2
(45) Date of Patent: Mar. 20, 2007

(54) PEEL-TREATING AGENT AND METHOD FOR PRODUCING THE PEEL-TREATING AGENT

(75) Inventors: Nobuo Kaifu, Yokohama (JP); Hiroshi Satoh, Yokohama (JP)

(73) Assignee: Hodogaya Chemical Co., Ltd., Kawasaki (JP)

( * ) Notice: Subject to any disclaimer, the term of this patent is extended or adjusted under 35 U.S.C. 154(b) by 664 days.

(21) Appl. No.: 10/191,449

(22) Filed: Jul. 10, 2002

(65) Prior Publication Data

US 2003/0013810 A1   Jan. 16, 2003

(30) Foreign Application Priority Data

Jul. 12, 2001 (JP) ............................. 2001-211895

(51) Int. Cl.
*C08G 18/06* (2006.01)
*B32B 33/00* (2006.01)

(52) U.S. Cl. ................ 528/44; 528/902; 528/904; 428/40.1; 428/41.8

(58) Field of Classification Search ............... 428/101, 428/343, 352, 355 R, 355 RA, 355 N, 40.1, 428/41.8; 528/44, 902, 904
See application file for complete search history.

(56) References Cited

U.S. PATENT DOCUMENTS 2,532,011 A * 11/1950 Dahlquist et al. .......... 428/40.1
3,052,652 A *  9/1962 Halpern et al. ............... 525/56

FOREIGN PATENT DOCUMENTS

| JP | 55-142096 | * | 11/1980 |
| JP | 56016516 A | * | 2/1981 |
| JP | 2000248425 | | 9/2000 |

OTHER PUBLICATIONS

Xia Chidan, et al., Study of the Curing Reaction of Diisocyanate with Polyvinyl Alcohol in Aqueous Solution, pp. 159-161, 1998, w/abstract.

* cited by examiner

*Primary Examiner*—Thao Tran
(74) *Attorney, Agent, or Firm*—Oblon, Spivak, McClelland, Maier & Neustadt, P.C.

(57) ABSTRACT

A peel-treating agent comprising a reaction product of an aliphatic isocyanate having an aliphatic group of at least 8 carbon number with an ethylene/vinyl alcohol copolymer or polyvinyl alcohol as an effective component, wherein a bisurea form content in the reaction product is at most 3 wt %.

4 Claims, No Drawings

PEEL-TREATING AGENT AND METHOD FOR PRODUCING THE PEEL-TREATING AGENT

BACKGROUND OF THE INVENTION

1. Field of the Invention

The present invention relates to a peel-treating agent comprising a reaction product of an aliphatic isocyanate having an aliphatic group of at least 8 carbon number with an ethylene/vinyl alcohol copolymer or polyvinyl alcohol as an effective component, and a method for producing the peel-treating agent.

2. Description of Background Art

Heretofore, there was known a urethane type peel-treating agent having an alkyl isocyanate added to an ethylene/vinyl alcohol copolymer or polyvinyl alcohol. For example, JP-B-2-7988 discloses a urethane type peel-treating agent of polyvinyl alcohol. JP-B-60-30355 discloses a urethane type peel-treating agent of ethylene/vinyl alcohol copolymer. Also, JP-B-4-28002 discloses a method for producing the urethane type peel-treating agent of ethylene/vinyl alcohol copolymer, wherein reaction including its intermediate product is carried out in a solution state by using a water-soluble solvent from the initiation to the end of the reaction.

Generally, in the production of the above peel-treating agent, an ethylene/vinyl alcohol copolymer or polyvinyl alcohol as a starting material is dispersed in an organic solvent such as toluene, and a water-soluble solvent such as dimethyl sulfoxide is added thereto with heating, and an aliphatic isocyanate such as octadecyl isocyanate is added and reacted with the ethylene/vinyl alcohol copolymer or polyvinyl alcohol. The ethylene/vinyl alcohol copolymer or polyvinyl alcohol is gradually dissolved when a water-soluble solvent such as dimethyl sulfoxide is added, and the periphery of a powder of the ethylene/vinyl alcohol copolymer or the like is reacted with an isocyanate to produce a urethane product of the aliphatic isocyanate with the ethylene/vinyl alcohol copolymer or polyvinyl alcohol (hereinafter referred to as "urethane product"). Since the urethane product is dissolved in toluene, the reaction proceeds in a solution state. In this case, in addition to an aimed urethane product, a bisurea form is by-produced and is precipitated in a reaction solution or is contained in the reaction solution, and is finally contained in the aimed urethane product. The bisurea form thus by-produced is a compound having a bond of —NH—CO—NH— in the center chained with an alkyl group of an aliphatic group at the both terminals of a molecule obtained by reaction of water and an aliphatic isocyanate used.

If the bisurea form is precipitated in the reaction solution, it damages a transportation pump when transporting the reaction solution from a reactor, and traps dusts to cause occlusion or clogging of a net (strainer), thereby lowering a productivity.

Also, if the bisurea form is contained in an aimed urethane product, the bisurea form is transferred to an adhesive agent layer to lower its adhesive force when a peel-treating agent containing the bisurea form is coated on the back side of a tape opposed to the adhesive agent.

Further, in order to obtain an aimed peel strength, an addition rate of an aliphatic isocyanate to an ethylene/vinyl alcohol copolymer or polyvinyl alcohol as starting materials is adjusted, but the isocyanate is consumed in the production of the bisurea form and a peel-treating agent having the aimed peel strength is hardly obtained. Still further, a peel-treating agent is usually supplied to a tape maker in a powdery state, but a tape maker having no facility of dissolving a peel-treating agent buys the peel-treating agent as a 10% solution and transports the solution and stores in a storing tank at normal temperature (around 25° C.). During storing at normal temperature, a bisurea form is precipitated if a temperature in the storing tank is lowered only a little by environmental temperature difference, and troubles are caused when storing or measuring an amount to be transported into a reaction tank.

SUMMARY OF THE INVENTION

The present invention relates to a peel-treating agent characterized in that a bisurea form content in an urethane product is at most 3 wt %, and a method for producing the peel-treating agent. Thus, by adjusting a bisurea form in a urethane product to not more than 3 wt %, there is provided an adhesive tape which prevents deterioration of performances of an adhesive agent caused by transferring of the bisurea form from a peel-treating layer to an adhesive layer, and there is also provided a peel-treating agent which can be stored or transported stably at normal temperature in a 10% toluene solution. Also, the method for producing a peel-treating agent in accordance with the present invention is a production method which produces a peel-treating agent having a stable quality at an improved yield.

That is, the present invention provides a peel-treating agent comprising a reaction product of an aliphatic isocyanate having an aliphatic group of at least 8 carbon number with an ethylene/vinyl alcohol copolymer or polyvinyl alcohol as an effective component, wherein a bisurea form content in the reaction product is at most 3 wt %.

Also, the present invention provides a method for producing a peel-treating agent comprising a reaction product of an aliphatic isocyanate having an aliphatic group of at least 8 carbon number with an ethylene/vinyl alcohol copolymer or polyvinyl alcohol as an effective component, which comprises adjusting a particle size of the ethylene/vinyl alcohol copolymer or polyvinyl alcohol to at most 10 mesh, subjecting to a dehydration operation to reduce their water content and then reacting with an aliphatic isocyanate, thereby controlling a bisurea form content in a reaction product to at most 3 wt %.

Further, the present invention provides a method for producing a peel-treating agent comprising a reaction product of an aliphatic isocyanate having an aliphatic group of at least 8 carbon number with an ethylene/vinyl alcohol copolymer or polyvinyl alcohol as an effective component, which comprises adjusting a particle size of the ethylene/vinyl alcohol copolymer or polyvinyl alcohol to at most 10 mesh, subjecting to azeotropic dehydration to reduce their water content, and then reacting with an aliphatic isocyanate, thereby controlling a bisurea form content in the reaction product to at most 3 wt %.

Still further, the present invention provides a method for producing a peel-treating agent comprising a reaction product of an aliphatic isocyanate having an aliphatic group of at least 8 carbon number with an ethylene/vinyl alcohol copolymer or polyvinyl alcohol as an effective component, which comprises adjusting a particle size of the ethylene/vinyl alcohol copolymer or polyvinyl alcohol to at most 10 mesh, subjecting to dehydration operation (preferably azeotropic dehydration) to reduce their water content, and removing a minor amount of a bisurea form by trapping with a sealed type pressure-filtrating machine to control the bisurea content in the reaction product to at most 3 wt %.

Still further, the present invention provides a method for producing a peel-treating agent comprising a reaction product of an aliphatic isocyanate having an aliphatic group of at least 8 carbon number with an ethylene/vinyl alcohol copolymer or polyvinyl alcohol as an effective component, which comprises adjusting a particle size of the ethylene/vinyl alcohol copolymer or polyvinyl alcohol to at most 10 mesh, subjecting to a dehydration operation (preferably azeotropic dehydration) to reduce their water content, and removing a minor amount of this urea form by trapping with a leaf-like sealed type pressure-filtrating machine to control the bisurea form content in the reaction product to at most 3 wt %.

Also, the present invention provides an adhesive tape or sheet comprising a substrate, an adhesive urea and a peel-treating agent layer, wherein a bisurea form content in a reaction product in the peel-treating agent layer is at most 3 wt %.

Also, the present invention provides a release sheet comprising a substrate and a peel-treating agent layer, wherein a bisurea form content in a reaction product in the peel-treating agent layer is at most 3 wt %.

DETAILED DESCRIPTION OF THE PREFERRED EMBODIMENTS

A peel-treating agent of the present invention, wherein a bisurea form content in a urethane product is at most 3 wt %, can be produced in the following manner. A particle-like ethylene/vinyl alcohol copolymer or polyvinyl alcohol having a particle size of at most 10 mesh is dispersed in a non-polar solvent such as toluene, and is subjected to azeotropic dehydration, and after lowering a temperature, a water-soluble solvent such as dimethylsulfoxide is optionally added thereto, and an aliphatic isocyanate such as octadecyl isocyanate is dropwise added thereto to make reaction.

After adjusting a particle size of the ethylene/vinyl alcohol copolymer or polyvinyl alcohol to at most 10 mesh, a method for removing a water content is not specially limited but may be carried out by a dryer. It is industrially preferable to employ an azeotropic dehydration method as a method for removing a water content, and the azeotropic dehydration operation includes a method for separating and removing a water content on the half way of a refluxing apparatus while refluxing. Also, a solvent used is not specially limited as far as it can be azeotropic with water, but it is preferable to employ the same solvent usable for coating the peel-treating agent of the present invention on a substrate, and preferable examples include toluene and xylene.

The finishing or end point of reaction can be confirmed by measuring a remaining amount of an isocyanate compound in a reaction mixture by an infrared spectrophotometer. Also, when finishing the above reaction, a catalyst such as an organic tin compound to accelerate a reaction between a hydroxyl group and an isocyanate group may be optionally used. After finishing the reaction, water is added to separate an oil layer and a water layer, and the oil layer is preferably filtrated through a filter to trap a minor amount of a bisurea form. The filter usable is not specially limited, but a sealed type pressure-filtrating machine is preferable since an object is to take a filtrate containing a reaction product and a solvent used is an organic solvent such as toluene. Commercially available examples of the sealed type pressure-filtrating machine include products such as tradename: Fundaback Filter or tradename: Leaf Filter, manufactured by Ishikawajima-Harima Heavy Industries Co., Ltd., and examples of a sealed type leaf-like pressure-filtrating machine include the above tradename: Leaf Filter and tradename: Ultrafilter manufactured by Miura Chemical Equipment Co., Ltd. Either a system of receiving a solution by another receiver through a filter from a container containing the solution or a circulating system of recirculating a solution from a container containing the solution through a filter into the container containing the solution may be used.

The oil layer (toluene, peel-treating agent) is introduced into a container previously containing methanol, and a reaction product is filtrated and dried to obtain a peel-treating agent as an aimed urethane product.

A ratio of an aliphatic isocyanate having an aliphatic group of at least 8 carbon number to an ethylene/vinyl alcohol copolymer or polyvinyl alcohol is not specially limited, but the aliphatic isocyanate is generally from 0.5 to 1.5 equivalent, preferably from 0.6 to 1.1 equivalent, to a hydroxyl group of the ethylene/vinyl alcohol copolymer or polyvinyl alcohol.

A particle size of the ethylene/vinyl alcohol copolymer or polyvinyl alcohol used in the production method of the present invention is preferably smaller than 10 mesh, more preferably smaller than 20 mesh.

The ethylene/vinyl alcohol copolymer usable in the present invention has a polymerization degree of from 500 to 3,000, preferably from 800 to 2,500, and an ethylene content of from 5 to 90 mol %, preferably from 20 to 60 mol %. Examples of commercially available products include tradename Eval manufactured by Kuraray Co., Ltd.: grade EP-F101, EP-H101, EP-E105 and EP-G110, and SOARNOL, manufactured by Nippon Synthetic Chemical Industry Co., Ltd.: grade ZL, Z, ZT, E and ET. Also, it is possible to use an ethylene/vinyl alcohol copolymer having ethylene oxide added, which is synthesized by addition-polymerize ethylene oxide into a vinyl group of an ethylene/vinyl alcohol copolymer. Its commercially available examples include tradename SUMIGUARD grade 300K or tradename SUMIGUARD grade 300G manufactured by Sumitomo Chemical Co., Ltd.

A polyvinyl alcohol used in the present invention has a polymerization degree of from 100 to 3,000, preferably from 150 to 2,000 and a saponification degree of from 50 to 100%, preferably from 60 to 100%. Its commercially available examples include tradename GOHSENOL N type POVAL (NH-26, NH-20, NH-18, N-300, NH-14, NH-11, NL-05), A type POVAL (AH-26, AH-22, AH-17, A-300, C-500, P-610, AL-06), G type POVAL (GH-23, GH-20, GH-17, GM-14, GM-14L, GL-05, GL-03), and K type POVAL (KH-20, KH-17, KM-11, KL-05, KL-03, KP-08, KP-06, NK-05) manufactured by Nippon Synthetic Chemical Industry Co., Ltd.

An aliphatic group of an aliphatic isocyanate use in the present invention is not specially limited, examples of which include an alkyl group, an alkenyl group, an alkynyl group and the like, preferably an alkyl group. The aliphatic group may be branched chain-like, but a linear chain-like aliphatic group is more preferable.

The aliphatic group should have a carbon number of at least 8 and there is no special upper limit, but the carbon number is preferably at most 30, more preferably at most 20.

Examples of the aliphatic isocyanate include a monoalkyl isocyanate such as octyl isocyanate or dodecyl isocyanate (lauryl isocyanate), preferably octadecyl isocyanate (stearyl isocyanate). Generally, octadecyl isocyanate includes monoalkyl isocyanates respectively having alkyl groups of a carbon number of 12, a carbon number of 14, a carbon number of 16, a carbon number of 17, a carbon number of 18 and a carbon number of 20, and its content ratio includes 1 to 10 wt % of an isocyanate having an alkyl group of a carbon number of 16, 0.5 to 4 wt % of an isocyanate having an alkyl group of a carbon number of 17 and 80 to 98 wt % of an isocyanate having an alkyl group of a carbon number of 18, which is a commercially available mixture. A preferable commercially available mixture includes 8 to 9 wt % of an isocyanate having an alkyl group of a carbon number of 16, 3 to 4 wt % of an isocyanate having an alkyl group of a carbon number of 17 and 85 to 87 wt % of an isocyanate having a carbon number of 18 as main components, and this mixture is commercially available as a tradename: MILLIONATE O manufactured by Hodogaya Chemical Co., Ltd.

These isocyanates may be used respectively alone or in a combination of two or more.

Examples of a substrate used for an adhesive tape or a release sheet of the present invention include a film of nylon, polyvinyl chloride, polyolefin such as polyethylene, polypropylene or polyester, and the like, and a paper of fibrous material such as woodfree paper, craft paper or crepe paper, but the substrate is not limited to these examples.

The substrate film may be stretched or nonstretched, but a stretched film is preferably in view of its strength, examples of which include a stretched polypropylene film, a stretched polyester film and the like. Its stretch ratio is not specially limited.

The substrate generally has a thickness of from 10 to 500 μm, preferably from 30 to 200 μm.

In case of an adhesive tape, a peel-treating layer is formed on the opposite side of an adhesive layer of the substrate. The peel-treating layer is provided in such a manner as to enable each rewinding of an adhesive tape winding.

A method for coating a peel-treating agent on the substrate may be any of known conventional methods. For example, a peel-treating agent solution having the peel-treating agent dissolved in a solvent such as toluene may be coated by a coating machine such as a gravure coater, an air knife coater or the like.

The peel-treating layer has a thickness of from 0.1 to 4 μm, preferably from 0.2 to 1 μm.

Also, in order to prevent static electricity or to prevent gelation, the peel-treating agent may contain a water-soluble solvent such as dimethyl sulfoxide, N,N-dimethylformamide or N-methylpyrrolidone, or the water-soluble solvent may be contained in a peel-treating agent solution having the peel-treating agent of the present invention dissolved in toluene or xylene.

An adhesive layer is formed on one side of a substrate of an adhesive tape, an adhesive sheet or a release sheet. The adhesive layer comprises an adhesive agent as the main component. The adhesive agent used in the present invention is not specially limited, and examples include a rubber type adhesive and an acrylic adhesive.

The rubber type adhesive may be any of natural rubber type and synthetic rubber type adhesives, and examples of the synthetic rubber type adhesive include a styrene/isobutylene/styrene copolymer and a styrene/butadiene/styrene copolymer.

Examples of the acrylic adhesive include an alkyl ester type polymer of acrylic acid or methacrylic acid, or an adhesive comprising an acrylic polymer having an average molecular weight of 5,000 to 3,000,0000 as the main component which comprises 50 to 99.5 wt % of an alkyl ester of acrylic acid or methacrylic acid and 0.5 to 50 wt % of an unsaturated monomer copolymerizable therewith.

If necessary, the adhesive layer may further contain a tackifier such as a petroleum type resin, a terpene type resin, a rosin type resin or a coumarone type resin, a plasticizer, an antioxidant, a coloring agent and the like.

A method for coating an adhesive on a substrate is carried out for example by a method which comprises dissolving the adhesive agent in a solvent such as toluene and coating the adhesive agent solution by a roll coater, a gravure coater, an air knife or the like. The adhesive layer usually has a thickness of 1 to 100 μm, preferably 20 to 80 μm.

EXAMPLES

Hereinafter, the present invention is further illustrated with reference to Examples. (All of parts are parts by weight.)

Example 1

(Preparation Method of Peel-Treating Agent)

Particles of an ethylene/vinyl alcohol copolymer (tradename EVAL, grade F101, manufactured by Kuraray Co., Ltd.) are sieved by a 10 mesh sieve, and 100 parts of the sieved ethylene/vinyl alcohol copolymer having a particle size less than 10 mesh is dispersed in 2,000 parts of toluene, and the resultant dispersion was refluxed in a refluxing apparatus for 2 hours, during which a water content was separated and removed, and the resultant product was cooled to 40 C, and 730 parts of dimethyl sulfoxide was added thereto, and 562 parts of octadecyl isocyanate (tradename: MILLIONATE O, manufactured by Hodogaya Chemical Co., Ltd.) was dropwise added thereto, and the resultant mixture was reacted at 120 C for 4 hours. During the reaction, a remaining isocyanate group in the reaction system was measured by an infrared spectrometer, and the reaction was decided to reach the end when the remaining isocyanate group disappeared. After the reaction, 335 parts of water was added to the reaction mixture, and the reaction solution was separated, and 4,130 parts of the reaction solution of toluene layer was placed in methanol to precipitate a white precipitiate, and the precipitate was filtrated and washed with methanol, and was dried and pulverized to obtain 636 parts of the aimed urethane product.

A bisurea form of the aimed urethane product thus obtained was analyzed by GPC (gel permeation chromatography), but the bisurea form was not detected.

(Analytical Conditions of GPC)

GPC: HLC-8020, manufactured by TOSOH CORPORATION, solvent: tetrahydrofuran, flow rate: 1 ml/min, column: G-6000, G-4000, G-2500, three columns in total.

Comparative Example 1

100 Parts of an ethylene/vinyl alcohol copolymer (tradename EVAL, grade F101, manufactured by Kuraray Co., Ltd.) was dispersed in 2,000 parts of toluene, and the resultant dispersion was refluxed for 2 hours in a refluxing apparatus, during which a water content was separated and removed, and the resultant product was cooled to 40° C., and 730 parts of dimethyl sulfoxide was added thereto, and 562 parts of octadecyl isocyanate (tradename: MILLIONATE O, manufactured by Hodogaya Chemical Co., Ltd.) was dropwise added thereto with stirring, and the resultant mixture was reacted at 120° C. for 4 hours. During the reaction, a remaining isocyanate group in the reaction system was measured, and the reaction was decided to reach the end when the remaining isocyanate group disappeared.

After the reaction, 335 parts of water was added to the reaction mixture, and the resultant reaction solution was separated, and the reaction solution of toluene layer was poured into 4,130 parts of methanol to precipitate a white precipitate. The precipitate thus obtained was filtrated and washed with methanol, and was dried and pulverized to obtain 636 parts of an aimed urethane product.

A bisurea form in the urethane product thus obtained was analyzed by GPC under the same conditions as in Example 1, and as this result, 4 wt % of a bisurea form was detected.

(Storing Test)

Each of the urethane products obtained in Example 1 and Comparative Example 1 was dissolved in toluene so as to make a 10 wt % solution, and the solution was stirred for 30 minutes and was allowed to stand at normal temperature (25° C.) for 1 day and was visually checked as to whether a precipitate was produced or not. There was no precipitate in the toluene solution having the product of Example 1 dissolved, but there was a precipitate in the toluene solution having the product of Comparative Example 1 dissolved.

The urethane product obtained in Example 1 was dissolved in toluene to prepare a 1 wt % solution, and the solution was coated on a corona discharge-treated side (one side) of a polypropylene film (hereinafter referred to as "OPP") as a substrate by a bar coater. A coated amount of the peel-treating agent was adjusted so as to provide 16 g/m$^2$ in terms of solid content calculation. The coated product was then dried at 90° C. for 1 minute to obtain a release sheet.

The adhesive surface of a pressure-sensitive adhesive (polyester tape 31E, manufactured by Nitto Denko Corporation) was placed in an opposed state to the peel-treating agent-coated surface of the release sheet, and the two layers were pressed and bonded by a roller having a self weight of 2 kg to prepare a plurality of test pieces having a width of 25 mm. The test pieces were subjected to a test in accordance with JIS Z0237 (test method of adhesive tape or adhesive sheet) in the following manner.

Each of the test pieces was allowed to stand (store) at a constant temperature of 20° C. under a constant humidity of a relative humidity of 65% for 1 day.

Thereafter, an initial peeling force (gf/25 mm) and an initial remaining adhesive force (gf/25 mm) of the test piece were measured at a constant temperature of 20° C. under a constant relative humidity of 65%. The peeling force was measured by peeling the release sheet from the pressure-sensitive adhesive under a condition of 90° peeling at a peeling rate of 300 mm/min. The remaining adhesive force was measured by pressing the adhesive face of the pressure-sensitive adhesive (the peeling force of which was measured as mentioned above) onto a stainless-made panel by a roller having a self weight of 2 kg and then peeling the pressure-sensitive adhesive from the panel under a condition of 180° peeling at a peeling rate of 300 mm/min. As this result, the peeling force was 2.7 N/25 mm and the remaining adhesive force was 6.5 N/25 mm. Thus, these results proved that the peel-treating agent of the present invention had satisfactory performances.

As evident from Example 1, the production method of Example 1 using an ethylene/vinyl alcohol copolymer having a particle size smaller than 10 mesh produces a less amount or substantially no amount of a bisurea form as compared with the production method of Comparative Example 1, and consequently the peel-treating agent of Example 1 is produced at a higher yield, and since an isocyanate is not consumed in the formation of the bisurea form, an addition rate of an aliphatic isocyanate into an ethylene/vinyl alcohol copolymer or polyvinyl alcohol is constant, thereby easily producing an aimed peel-treating agent. Also, even when the 10% toluene solution is stored at normal temperature, a bisurea form does not precipitate and consequently the toluene solution can be easily transported and stored.

As evident from Example 1, the peel-treating agent of the present invention has a satisfactory peeling force and does not produce a substantial amount of bisurea form, and consequently, when the adhesive tape prepared in Example 1 is stored for a long term, there is no fear that a bisurea form, which is a lower molecular weight material as compared with the peel-treating agent transfers into the adhesive agent layer and the adhesive force is lowered.

The entire disclosure of Japanese Patent Application No. 2001-211895 filed on Jul. 12, 2001 including a specification, claims and a summary are incorporated herein by reference in its entirety.

What is claimed is:

1. A peel-treating agent comprising a reaction product of an aliphatic isocyanate having an aliphatic group of at least 8 carbon number with an ethylene/vinyl alcohol copolymer or polyvinyl alcohol, as an effective component, wherein a bisurea form content in the reaction product is at most 3 wt %, wherein the ethylene/vinyl alcohol copolymer or polyvinyl alcohol has a particle size no larger than particles that would pass through a sieve of size 10 mesh.

2. An adhesive tape or sheet comprising a substrate, an adhesive layer and a peel-treating layer, wherein the peel-treating layer contains a peel-treating agent as defined in claim 1.

3. A release sheet comprising a substrate and a peel-treating layer, wherein the peel-treating layer contains a peel-treating agent as defined in claim 1.

4. The peel-treating agent as defined in claim 1, wherein said ethylene/vinyl alcohol copolymer or polyvinyl alcohol has a particle size no larger than particles that would pass through a sieve of size 20 mesh.

* * * * *